(12) United States Patent
Arnold et al.

(10) Patent No.: US 7,861,300 B2
(45) Date of Patent: Dec. 28, 2010

(54) METHOD AND APPARATUS FOR DETERMINATION OF THE NON-REPLICATIVE BEHAVIOR OF A MALICIOUS PROGRAM

(75) Inventors: William C. Arnold, Mahopac, NY (US); David M. Chess, Mohegan Lake, NY (US); John F. Morar, Mahopac, NY (US); Alla Segal, Mount Kisco, NY (US); Ian N. Whalley, Pawling, NY (US); Steve R. White, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 12/141,165

(22) Filed: Jun. 18, 2008

(65) Prior Publication Data

US 2008/0256633 A1    Oct. 16, 2008

Related U.S. Application Data

(63) Continuation of application No. 11/514,868, filed on Sep. 1, 2006, now abandoned, which is a continuation of application No. 10/141,896, filed on May 8, 2002, now Pat. No. 7,103,913.

(51) Int. Cl.
*G06F 11/00* (2006.01)
(52) U.S. Cl. ............................. 726/22; 726/13; 726/24; 713/188
(58) Field of Classification Search ............. 726/22–25; 713/188; 709/224; 714/38
See application file for complete search history.

(56) References Cited

U.S. PATENT DOCUMENTS

| 5,440,723 | A | 8/1995 | Arnold et al. ................ 395/181 |
|---|---|---|---|
| 5,485,575 | A | 1/1996 | Chess et al. ............. 395/183.14 |
| 5,613,002 | A | 3/1997 | Kephart et al. .................. 380/4 |
| 5,745,669 | A * | 4/1998 | Hugard et al. .................. 714/3 |
| 5,826,013 | A | 10/1998 | Nachenberg ................. 726/22 |
| 6,067,410 | A | 5/2000 | Nachenberg ........... 395/500.49 |
| 6,108,799 | A | 8/2000 | Boulay et al. ................. 714/38 |
| 6,842,861 | B1 | 1/2005 | Cox et al. .................... 713/188 |
| 6,971,019 | B1 * | 11/2005 | Nachenberg ................ 713/188 |
| 2005/0268338 | A1 | 12/2005 | van der Made ............... 726/24 |

\* cited by examiner

*Primary Examiner*—Kimyen Vu
*Assistant Examiner*—Baotran N To
(74) *Attorney, Agent, or Firm*—Harrington & Smith (57) ABSTRACT

Disclosed is a method, a computer system and a computer readable media product that contains a set of computer executable software instructions for directing the computer system to execute a process for determining a non-replicative behavior of a program that is suspected of containing an undesirable software entity. The process causes execution of the program in at least one known environment and automatically examines the at least one known environment to detect if a change has occurred in the environment as a result of the execution of the program. If a change is detected, the process automatically analyzes the detected change (i.e., the process performs a side effects analysis) to determine if the change resulted from execution of the program or from execution of the undesirable software entity. The process then uses the result of the analysis at least for undoing a detected change that results from execution of the undesirable software entity. The result of the analysis can also be used for informing a user of an anti-virus system of the non-replicative changes made to the environment.

28 Claims, 5 Drawing Sheets

METHOD AND APPARATUS FOR DETERMINATION OF THE NON-REPLICATIVE BEHAVIOR OF A MALICIOUS PROGRAM

CROSS REFERENCE TO RELATED APPLICATION

This application is a continuation of U.S. patent application Ser. No. 11/514,868 filed on Sep. 1, 2006 now abandoned, which is a continuation of U.S. Ser. No. 10/141,896 filed on May 8, 2002 and is now issued U.S. Pat. No. 7,103,913.

FIELD OF THE INVENTION

This invention relates generally to methods and apparatus for automated protection from malicious programs and undesirable software entities, and relates more specifically to improvements in those automatic protection methods and apparatus that rely on eliciting a replicative behavior from computer viruses and other undesirable software entities.

BACKGROUND OF THE INVENTION

It is known in the art to elicit replicative behavior of undesirable software entities, such as computer viruses, to facilitate the detection and removal of these software entities from infected programs. Note that an undesirable software entity may not necessarily be a malicious program, as its execution may not result directly in the intentional destruction of files, boot records and the like.

For the purposes of this patent application, a Computer Virus is defined as follows: a virus is a self-replicating program or routine that spreads in a possibly modified manner without direct human interaction. Reference in this regard may be had to commonly assigned U.S. Pat. No. 5,613,002, incorporated by reference herein in its entirety.

As employed herein, a Worm program is one that can clandestinely send a copy of itself between computers on a computer network, and that uses a network service or services to replicate. Examples of such network services include, but are not limited to, routing, name resolution and mail storage.

Also for purposes of this patent application, a Trojan Horse program is defined as a program that need not replicate or copy itself, but that damages or compromises the security of the computer. An example of a Trojan Horse program includes a script hidden in a joke email, which is manually distributed. Another example of a Trojan Horse Program includes an entire program, such as a screen saver that is freely distributed.

Replicative behavior is not the only behavior exhibited by undesirable software entities, at least in the sense that replicative behavior is exhibited by computer viruses. This creates a different type of problem in computer systems, as some undesirable software entities make changes to the system state in addition to replicating. These changes to the system state can include modifications made to, for example, files, records, registries, logs and so forth. These changes to the system state may be referred to as "side effects", i.e., the tangible result or results of the execution of the undesirable software entity in an infected computer system (and/or computer network). Prior to this invention, the automated detection of side effects was not adequately provided for, and thus the automated removal of the changes made to the system by the responsible undesirable software entity could be incomplete. This is true at least for the reason that conventional disinfection methods and systems will successfully remove the undesirable software entity itself, but they will fail to remove the side effects caused by the undesirable software entity. The (previously unmet) goal of such detection and removal would be the automatic restoration of the system to the state that existed prior to the infection.

In the current state of the art the detection of side effects was a manually intensive process that produced inconsistent, inefficient and unreliable results. Even in the framework of the automated analysis of malicious software, the samples containing side effects were typically deferred for human examination. This resulted in a slowing of response time which, as can be appreciated, may be very undesirable when faced with a new instance of a malicious and fast spreading virus, worm or widespread Trojan horse. In many commercial anti-virus products the side effects, such as created files, are only noticed if they contain the signature of a known virus, worm or Trojan horse, thereby limiting their ability to detect side effects associated with malicious software.

The dynamic analysis of suspected computer viruses is described in commonly assigned U.S. Pat. No. 5,440,723, "Automatic immune system for computers and computer networks" by William C. Arnold et al. A method for the automated replication and analysis of worms is described in the commonly assigned U.S. patent application Ser. No. 09/640,453, filed Aug. 17, 2000, "Method and apparatus for replicating and analyzing worm programs" by William C. Arnold et al. A method for the automatic analysis of computer viruses and the generic repair is described in commonly assigned U.S. Pat. No. 5,485,575, "Automatic analysis of a computer virus structure and means of attachment to the host" by David M. Chess et al. A generic repair technique is described in U.S. Pat. No. 6,067,410, "Emulation repair systems" by Carey Nachenberg.

All of these patents concentrate on the replicative behavior of malicious software. Currently, the inventors are not aware of automated procedures and systems for the detection of non-replicative changes made to an infected computer system.

SUMMARY OF THE PREFERRED EMBODIMENTS

The foregoing and other problems are addressed and solved by methods and apparatus in accordance with the teachings of this invention.

This invention uses a controlled environment, which may be similar to that described in the above mentioned U.S. patents, to exercise a suspect infected program, also referred to herein as a sample, and to determine the non-replicative changes made by a malicious software to a computer system. The examples of the most typical non-replicative changes to the system are modified, created, renamed, hidden or deleted files, changes to the system registry and changes to system initialization files.

A method in accordance with this invention executes steps that include selecting or otherwise obtaining at least one program suitable for the goal of non-replicative changes detection, exercising the program(s) in a controlled environment in a manner that is most likely to trigger the system changes so as to facilitate the identification and analysis of the changes.

One of the first problems faced during the automatic determination of the side effects is that of the differentiation between the changes that occur during normal operation of an uninfected program and those made by the undesirable software entity. In the preferred embodiment of this invention this is accomplished by comparing the changes to the system made by the same program before and after it is infected, assuming that both before and after copies of the program are available. This invention achieves this by (a) infecting a known (uninfected) program, then (b) running the infected program in the controlled environment. This technique is most effective when there are replicative changes to the system in addition to the non-replicative changes, i.e., when the original sample contains a virus. This invention may also create a "clean" copy of the original sample by repairing it generically, assuming that the original sample is capable of being repaired generically. This invention may also use heuristics to recognize that the undesirable software entity is, in fact, an infected copy of a known or commonly used program such as, for example, NOTEPAD.EXE or CALC.EXE. The heuristics include, but need not be limited to, (i) the pattern of changes to the system, and/or (ii) the look and feel of the program, such as the characteristics of its menus, dialogs and classes. In order to improve the detection reliability, it is preferred to use the foregoing in combination with other heuristics by maintaining a database storing information regarding all or some of changes made to the system by the execution of some sample of commonly used (uninfected) programs.

The teachings of this invention recognize and solve another problem that arises in the detection of side effects, i.e., the problem of the inconsistency in the changes that occur in the system. That is, the system changes can vary depending on the state of the system, the time or a date a sample is run, or in some random fashion. Thus, in some cases it is desirable to have multiple samples and to execute multiple runs using the multiple samples. The actual number of the required runs is determined based on, for example, the time that a given computer system can allow for the analysis of an individual program, as well as on the pattern of changes made by the malicious software to the system.

During the analysis of the results in accordance with this invention the non-replicative changes are obtained by comparing the states of the system both before and after the process of exercising the malicious software, and by comparing the resulting differences in the system state with the changes made to the system state by a "clean" or "known not to be infected" copy of the same software, whenever it is available.

Several special cases (for example, renamed files and hidden files) are identified by comparing created files with the original copies of the infected files (if they exist), deleted files or hidden files. The changes to the system initialization files and the system registry are also analyzed both by themselves and in correspondence between them and created or changed files.

Once the changes to the system state are identified, this information can be used for the future automatic reversal of the system changes or side effects made by the responsible undesirable software entity.

An important aspect of this invention is the ability that it provides to enumerate side-effects or changes so as to: (a) describe them for the user; and, (b) to enable them to be undone programmatically. A comparison is made (when it is possible) of system state before and after program execution to distinguish side effects that result from the presence of a malicious or otherwise undesirable software entity.

The goal of this invention is not virus detection or the disinfection of infected programs per se. Instead, a goal of this invention is to automatically identify the side effects of a malicious program, i.e., the behavior other than that of infecting other files, and thus: (a) provide the information to the user of an anti-virus system; and/or (b) provide information that an anti-virus software can use to automatically remove these side effects from the system.

It should be noted that a malicious program may, or it may not, exhibit replicative behavior as well. That is, it could infect other files as well as exhibiting non-replicative side effects, or it could only exhibit side effects. In either case a simple disinfection of infected files or removal of a worm file (as is done in conventional practice) will not be sufficient to cleanse the system.

The problems solved by the teachings of this invention include: identifying which side effects are malicious and which are not; and resolving the inconsistency in side effects that can occur as the result of the execution of some malicious entities.

A method in accordance with this invention executes a program in at least one known environment and automatically examines the at least one known environment to detect if a change has occurred in the environment as a result of the execution of the program. If a change is detected, the method automatically analyzes the detected change to determine if the change resulted from execution of the program or from execution of the undesirable software entity. The method then uses the result of the analysis for at least one of undoing a detected change that results from execution of the undesirable software entity, and informing a user of the changes that have been observed as a result of execution of the undesirable software entity.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

The preferred embodiment of the invention uses the environment similar to the one described in U.S. patent application Ser. No. 09/640,453, filed Aug. 17, 2000, "Method and apparatus for replicating and analyzing worm programs" by William C. Arnold et al. This environment includes a controlling component and an emulation component. In the preferred embodiment of this invention the emulation component is used for both replicative and non-replicative behavior elicitation. An important purpose of the replicative behavior solicitation (e.g., virus replication) component is for infecting programs whose non-replicative behaviors prior to infection are known.

Figure 1:
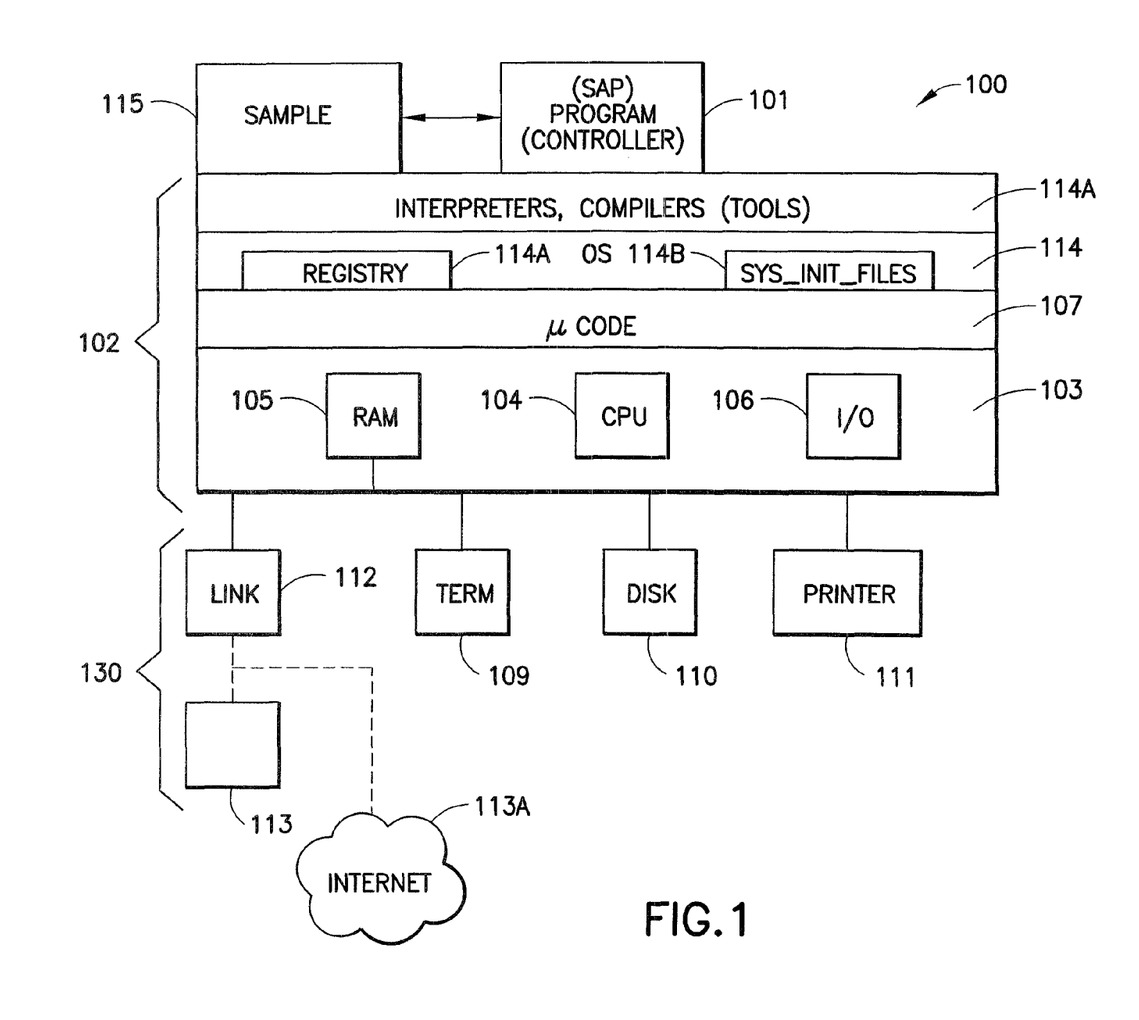
FIG. 1 is a block diagram of a data processor suitable for the implementation of this invention.

FIG. 1 shows a block diagram of a typical computing system 100 where the preferred embodiment of this invention can be practiced. The computer system 100 includes a computer platform 102 having a hardware unit 103, and a software-analyzing program (SAP) 101, also referred to herein as a controller 101, that implements the methods disclosed below. The SAP 101 operates on the computer platform 102 and hardware unit 103. The hardware unit 103 typically includes one or more central processing units (CPUs) 104, a memory 105 that may include a random access memory (RAM), and an input/output (I/O) interface 106. Microinstruction code 107, for example a reduced instruction set, may also be included on the platform 102. Various peripheral components 130 may be connected to the computer platform 102. Typically provided peripheral components 130 include a display 109, an external data storage device (e.g. tape or disk) 110 where the data used by the preferred embodiment is stored, and a printing device 111. A link 112 may also be included to connect the system 100 to one or more other similar computer systems shown simply as the block 113. The link 112 is used to transmit digital information between the computers 100 and 113. The link 112 may also provide access to the global Internet 113a. An operating system (OS) 114 coordinates the operation of the various components of the computer system 100, and is also responsible for managing various objects and files, and for recording certain information regarding same, such as date and time last modified, file length, etc. Associated with the OS 114 in a conventional manner is a registry 114A and system initialization files (SYS_INIT_FILES) 114B, the use of which are discussed in detail below. Lying above the OS 114 is a software tools layer 114A containing, for example, compilers, interpreters and other software tools. The interpreters, compilers and other tools in the layer 114A run above the operating system and enable the execution of programs using the methods known to the art.

One suitable and non-limiting example of computer system 100 is the IBM IntelliStation™ (trademark of the International Business Machines Corporation). An example of a suitable CPU is a Pentium™ III processor (trademark of the Intel Corporation); examples of an operating systems are Microsoft Windows™ 2000 (trademark of Microsoft Corporation) and a Redhat build of GNU/Linux; examples of an interpreter and a compiler are a Perl interpreter and a C++ compiler. Those skilled in the art will realize that one could substitute other examples of computing systems, processors, operating systems and tools for those mentioned above. As such, the teachings of this invention are not to be construed to be limited in any way to the specific architecture and components depicted in FIG. 1.

The SAP or controller 101 operates in accordance with the teachings of this invention to determine non-replicative changes resulting from the execution of a suspected malicious program or undesirable software entity, referred to herein generically as a sample 115.

Figure 2:
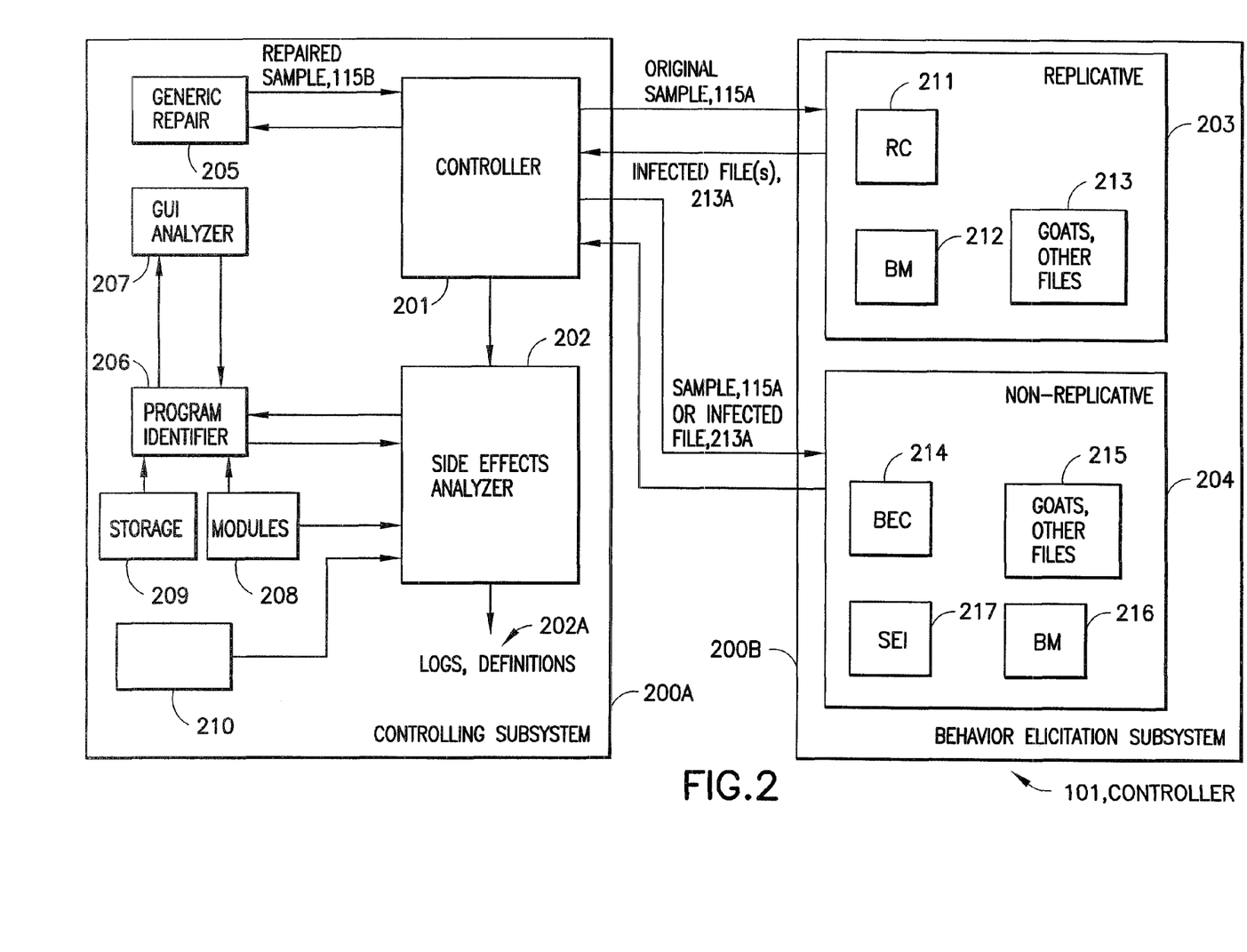
FIG. 2. is a logical block diagram of major components of the preferred embodiment of this invention, and also shows the interaction between the major functional blocks.

A presently preferred, but non-limiting, embodiment of the SAP or controller 101 uses multiple computers, one of which runs a controlling subsystem 200A and another of which runs a behavior elicitation subsystem 200B. Both of these subsystems are shown in FIG. 2.

An important element of the controlling subsystem 200A is a local controller 201 responsible for the overall control of the side effects elicitation and detection process. Its functions include setting up, starting and stopping the emulated subsystems when necessary, controlling the flow of data within the controlling subsystem 200A, and making a partial analysis of the results. Other parts of the controlling subsystem 200A include a generic repair component 205, a side effects analyzer 202, a program identifying component 206 and a graphical user interface (GUI) analyzer 207. Static data concerning the side effects of most commonly used programs and those programs specially prepared for the elicitation process, known in the art as goats, are stored in module 208, Graphical User Interface "look and feel" information about commonly used programs is stored in module 209 and combined information concerning most common non-malicious changes is stored in module 210.

The behavior elicitation subsystem 200B running in the emulated environment preferably includes a replicative section or subsystem 203, which may be used for virus replication, and a non-replicative behavior elicitation section or subsystem 204. The virus replicator 203 receives a sample 115 to be analyzed, thereafter known as the original sample 115A, from the controller 201 and attempts to have it infect known programs 213 using the process known in the art as virus replication. The virus replicator 203 includes a replicator controller RC 211 that controls all aspects of local virus replication, such as running the sample 115A and manipulating the go at files 213. The virus replicator 203 also includes a behavior monitor BM 212 that monitors access to files and to the system registry 114A that may occur during virus replication. Known files 213 that may become infected during this process comprise the uninfected goat files, as well as commonly used programs and utilities such as, for example, NOTEPAD.EXE and CALC.EXE.

While the emulated environment is preferably isolated from the remainder of the system in order to prevent the latter from becoming infected, the disk images of the environment used for virus replication can be retrieved and used for comparison with original disk images in order to determine the nature of the changes made by the virus. The actual details of the process of virus replication are well known in the art, as evidenced by the above-cited commonly assigned U.S. patents and patent applications, incorporated by reference herein in their entireties, and are not particularly relevant to the teachings of this invention.

The non-replicative behavior elicitor 204 receives from the controller 201 either the original sample 115A or one of the files infected during the virus replication process executed by virus replicator 203 (e.g., it receives an infected goat file 213A). The non-replicative behavior elicitor 204 attempts to elicit non-replicative behavior from the original sample 115A or from the infected file 213A, both of which may be referred to for convenience as a sample in the context of the non-replicative behavior elicitor 204.

A behavior elicitation controller BEC 214 runs, for example, the sample 115A, saves the registry 114A information and manipulates the files in the system as directed by the operation of the executing sample. Behavior monitors 216 can be the same as in BM 212, but their function is more important here as the information provided by them is used by the side effects 114A access monitor can be used to determine the registry 114A changes resulting from the execution of the original sample 115A in the elicitation environment. In the case where the sample 115A of malicious software copies a file to a different location, and then overwrites the original file with its copy, file access monitor information may contain the pattern of read and write instructions suggestive of a file being copied. The presence of the goat files 215, while not essential to the operation of the non-replicative behavior elicitor 204, is useful for the elicitation of behaviors such as renaming, hiding and deleting files, as well as for an analysis of the correspondence, if any, between replicative and non-replicative system state changes.

An optional side effects inciting component SEI 217 can be used, when present, to respond to environmental requests by the sample 115A, which are detected by the behavior monitors 215, in a way that is calculated to incite side effects creation. For example, if the sample 115A tests to see if it has the option to change file attributes for a non-existent file, SEI 217 may indicate to the sample 115A that this ability is allowed. Further by example, if the sample program 115A searches for a particular file in a particular directory, then SEI 217 makes it appear that the operating system 114 has responded that the file exists. Further by example, if the sample program 215A attempts to contact a specific URL, then SEI 217 ensures that the system indicates that the URL exists. That is, the SEI 217 plays the role of an encouraging host to the executing sample 115A.

In a manner somewhat similar to the virus replication environment 203, disk images of the environment used during non-replicative behavior elicitation can be retrieved and compared to the original disk images.

If the virus replicator 203 fails to infect the known files 213, an attempt is made to repair the original sample 115A using the generic repair component 205 of the controlling subsystem 200A. The generic repair component 205 attempts to generically repair the original sample program 115A using, as an example, the method described in commonly assigned U.S. Pat. No. 5,485,575 "Automatic analysis of a computer virus structure and means of attachment to the host" by David M. Chess et al., or in U.S. Pat. No. 6,067,410 "Emulation repair systems" by Carey Nachenberg, or by any other suitable methods known to the art.

As an example, in U.S. Pat. No. 5,485,575 information pertaining to the verification of the identity of, and reversal of, a transformation of computer data is derived automatically based on a set of samples, where the most important class of transformations may be computer viruses. The process extracts this information for a large, fairly general class of viruses. Samples of host programs infected with the virus and sample pairs of an infected host and the corresponding original, uninfected host are obtained. A description of how the virus attaches to the host program is generated, including locations within the uninfected host of components of both the original host and the virus. Viral code is matched across samples to obtain a description of "invariant" regions of the virus, and host bytes embedded within the virus are located. A description of the original host locations permits ant-virus software on a user's machine to restore the bulk of a program that has been infected. Characterization of the correspondence between invariable portions of the virus and destroyed parts of the host enables the anti-virus software to complete the repair.

Further by example, in U.S. Pat. No. 6,067,410 an emulation repair system restores virus-infected computer files to their uninfected states, without risk of infecting the rest of the computer system, by providing a virtual machine for emulating the virus-infected computer file, a foundation module that includes generic, machine language repair routines, and a virus specific overlay module. The emulation repair system receives the identity of the infected computer file and the infecting virus from a virus scanning module and uses the received information to access a virus definition that includes decryption information on the identified virus. The infected computer file is emulated in the virtual machine until it is determined from comparison with the decryption information that the virus is fully decrypted. The foundation and overlay modules are then loaded into the virtual machine and control of the virtual machine is given to the overlay module. The overlay module calls the repair routines in the foundation module, the overlay module, and the virus itself, as necessary, to restore over-written host bytes from the infected host file to their proper locations in the infected host file. Repairs made to the image of the host file in the virtual machine are then reflected to a back-up file in the computer system.

By whatever process it is generated, the generically repaired sample 115B is then sent to the non-replicative behavior elicitor 204 to determine its non-malicious non-replicative changes, as this information is assumed to not be available from the data stored in the module 208 that describes the side effects of the most commonly used programs and the goat files 213.

The side effects analyzer 202 analyzes the results from the non-replicative behavior elicitation and determines the malicious non-replicative changes to the system. In doing this, the side effects analyzer 202 compares the images of the non-replicative behavior solicitation environment before and after the sample 115A is run, and compares the changes with those made by the uninfected program corresponding to the sample 115A. If the virus replicator 203 was successful, and the sample used for behavior elicitation was an infected known file 213A, the information needed for the second comparison can be found in the module 208.

If the operation of the generic repair 205 was successful, the information is determined by the comparison of the before and after images of the non-replicative behavior solicitation generic repair 205 fail, the side effects analyzer 202 invokes the program identifier 206 to determine if the original sample 115A is a copy of an existing known program; for example WORDPAD.EXE.

The program identifier 206 attempts to determine if the original sample 115A is a copy of an existing program by using the results from the non-replicative behavior elicitor 204, the information of the non-replicative changes made to the system by most common programs, stored in module 208, the GUI analyzer 207, and the "look and feel" of the most common programs stored in the module 209.

As was noted, the GUI analyzer 207 determines the "look and feel" of the original sample 115A. The "look and feel" of a program may include, for the purposes of this invention, information concerning menu items, the windows displayed by the program and the number of controls on each window, as examples. For example, in a Windows™ system some readily obtainable information includes the number of menu items, the number of items of each submenu, codes for the WM_COMMAND message that are triggered by the user's clicking on each menu/submenu item, the text displayed on the menu items, windows classes and titles and the text and classes of the dialog controls. While the names and the titles may differ depending on the language of the program, the number of items, the message codes and the windows classes are constant for the same version of the program. In cases where the main window of an application does not contain enough identifying information, the program can be further automated by clicking on one or more of the menu items and identifying the results of such actions, as well as the visual objects present in the opened dialogs. Further reference with regard to this aspect of these teachings can be found in commonly assigned U.S. patent application Ser. No. 09/754,804, filed Jan. 4, 2001, "Method and Apparatus for Exercising an Unknown Program with a Graphical User Interface" by Alla Segal et al., incorporated by reference herein in its entirety.

The module 208 stores the information concerning the characteristic changes to the system resulting from the execution of the commonly used programs and goat files 213. For example, the execution of programs such as PAINTBRUSH or WORDPAD cause changes to be made to very specific registry 114A keys, while the execution of other programs may cause the creation of specific files.

The module 208 also preferably stores a priority number that rates the known programs by their suitability for the non-replicative changes determination performed in subsystem 204. A program is deemed "most suitable" if the results of its execution before being infected result in the occurrence of the least number of side effects. A simple program that makes no registry 114A changes or very few registry 114A changes is considered very suitable, while a program such as WORDPAD.EXE that makes many inconsistent registry 114A changes, e.g., registry 114A changes that vary depending on the name under which WORDPAD.EXE is run, or on the time when it is run, are considered the least suitable. The entries in module 208 are thus preferably prioritized based on their suitability for use by the side effects analyzer 202. This information is used to select the "best" infected file 213A in those cases when the virus replicator 203 succeeds in infecting a plurality of the known programs 213 (see Step 305 in FIG. 3A). For example, an infected WORDPAD.EXE file would not be selected if there were another infected known file having a priority number that indicated that the results of its execution results in the generation of fewer side effects.

For efficiency reasons it is presently preferred that the most commonly used programs and goat files 213, 215 are run in the behavior solicitation environment 200B prior to the time any malicious software is receive, and the resulting information is saved in module 209. For the same reason the most commonly used programs 213, 214 that have a graphical user interface are analyzed by the GUI analyzer 207 for their "look and feel", and the resulting information is saved in module 209. The information in both modules 208 and 209 preferably remains static throughout the process executed in accordance with this invention, and may be changed only occasionally when the system configuration is changed and/or new commonly used programs 213, 215 are added.

The most common non-malicious changes that are found to occur in the emulating system or environment are stored in the module 210. This information comprises the information that is obtained by combining the results of the operation of the non-replicative elicitation subsystem 204 for the most common (non-infected) programs 215. This information need only be used if a corresponding uninfected program cannot be obtained.

Figure 3A:
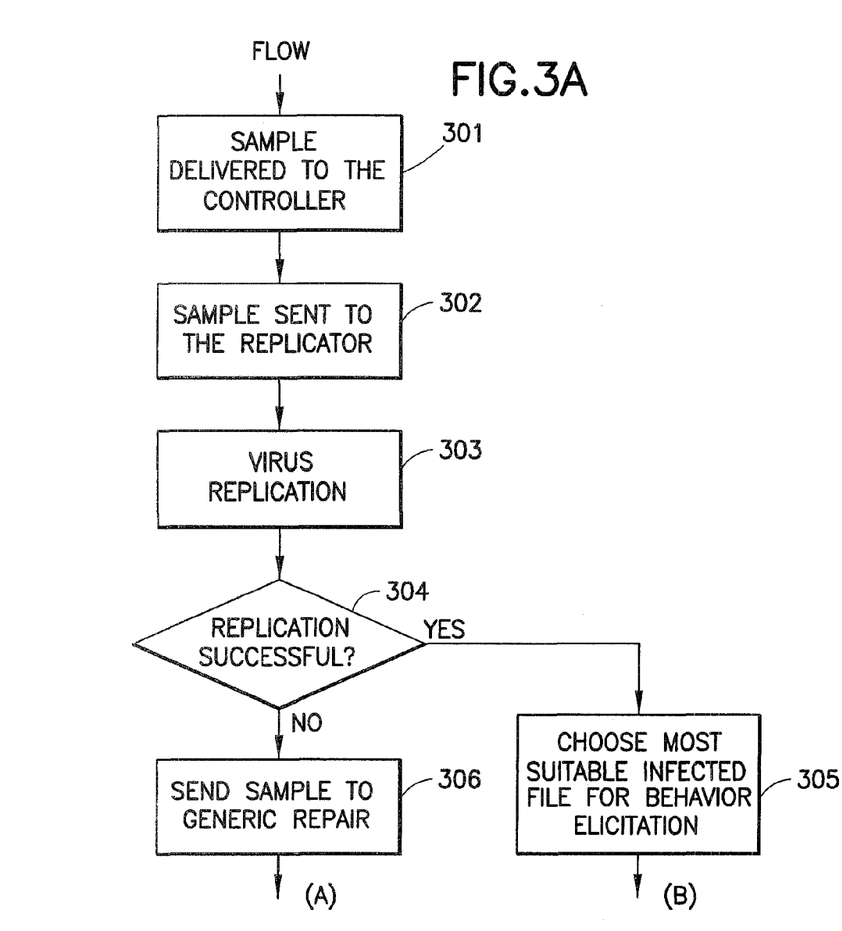
FIGS. 3A, 3B, 4A, 4B, 5A and 5B, referred to collectively herein as FIGS. 3, 4 and 5, are each a logic flow diagram illustrating the presently preferred embodiments of the methods disclosed in accordance with the teachings of this invention.
Figure 3B:
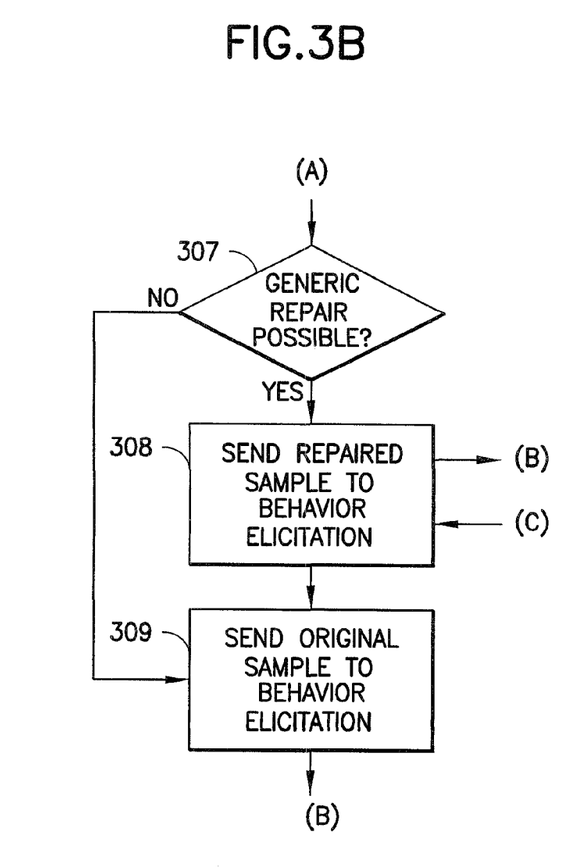
Figure 4A:
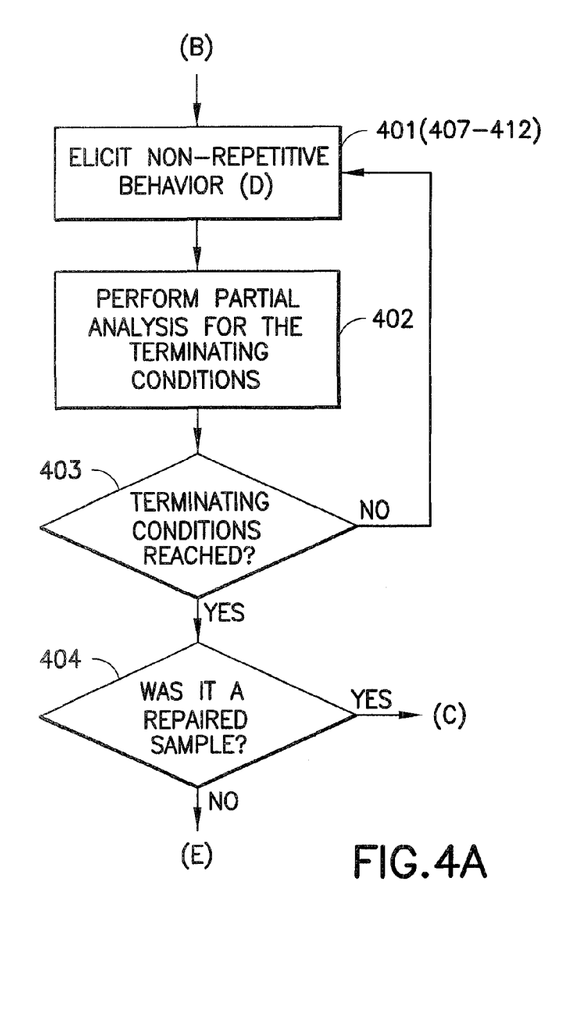
Figure 4B:
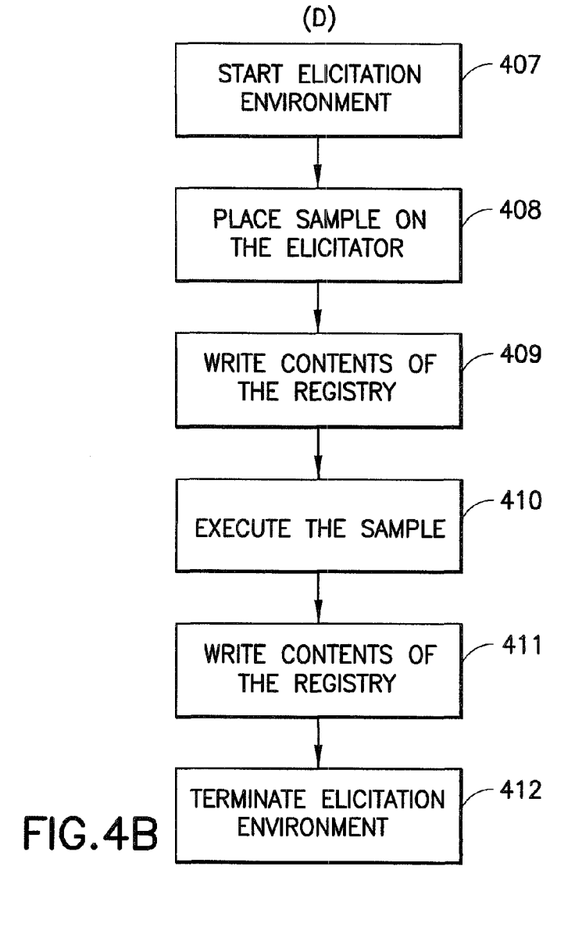
Figure 5A:
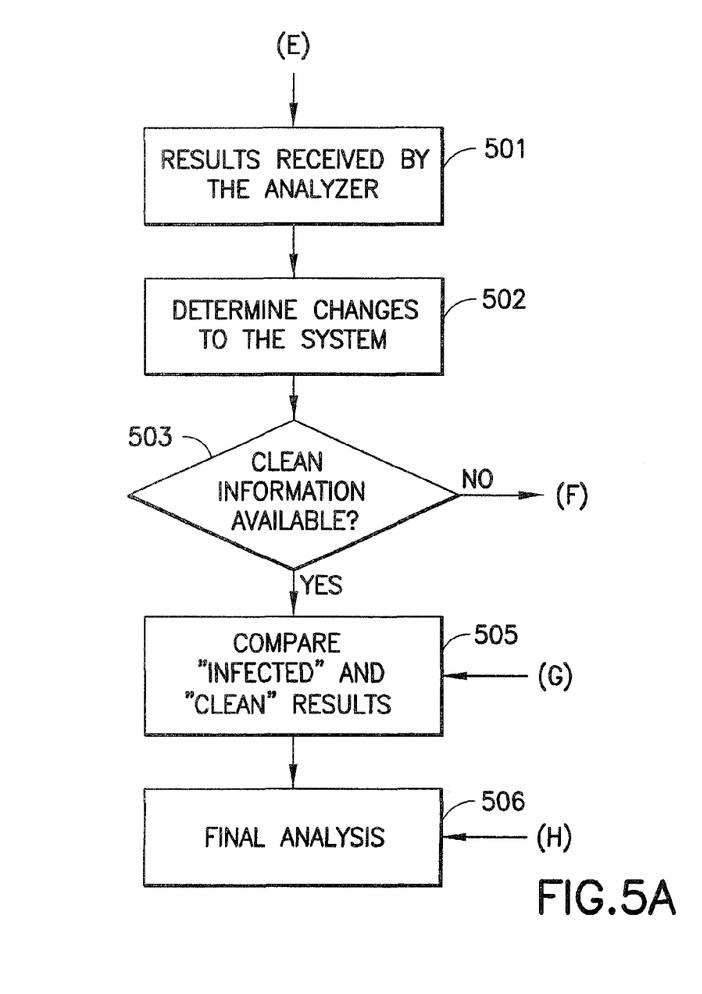
Figure 5B:
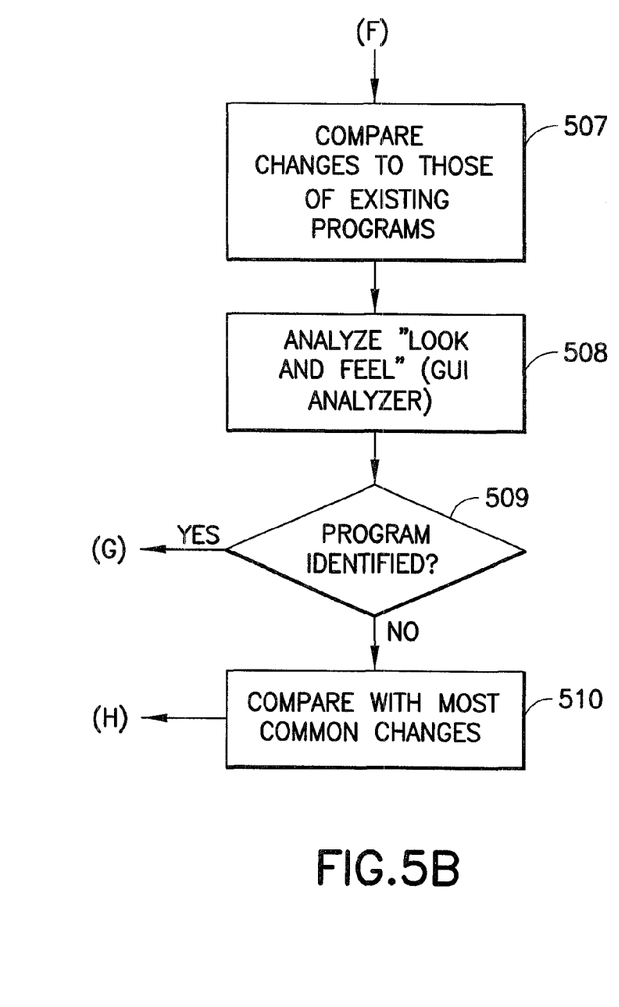

FIGS. 3, 4 and 5 are descriptive of a presently preferred embodiment of a method for non-replicative change detection using the hardware embodiment depicted in FIGS. 1 and 2. FIGS. 3A and 3B illustrate the process for the selection of the sample 115 for use by the non-replicative behavior elicitation subsystem 204. At Step 301, the original sample 115A is first received by the controller 201, and is sent at Step 302 to the virus replicator 203. At Step 303 the virus replicator 203 attempts to replicate, if present in the sample, a virus or some other undesirable software entity that is capable of self-replication. If the replication is successful, i.e., if one or more of the known files 213 are found to have become infected at Step 304, a most suitable one of the infected files is selected at Step 305 and is sent as the infected file 213A to the non-replicative behavior elicitor 204. The selection of the most suitable infected file can be made as described above, i.e., based on the entries in module 208 being prioritized as a function of their suitability for use by the side effects analyzer 202. If it is determined at Step 304 that the replication was not successful, the original sample 115A is sent to the generic repair module 205 at Step 306. If the generic repair is found to be possible (Step 307), i.e. if the original sample 115 is successfully repaired, the repaired sample 115B is sent to the non-replicative behavior elicitation subsystem 204, and the information concerning the resulting changes to the system are saved in Step 308 for future use by the side effects analyzer 202. The original sample 115A is then sent to the non-replicative behavior elicitor 204 at Step 309. Step 309 is also executed directly if it is found at Step 307 that the generic repair operation is not possible.

FIGS. 4A and 4B illustrate the flow of control during the elicitation phase. FIG. 4A shows the flow within the controller 201 during the elicitation phase, while FIG. 4B provides a detailed view of the flow within the non-replicative behavior elicitor 204. At Step 401 the controller 201 initializes the elicitation environment and runs the non-replicative behavior elicitor 204 whose actions are shown in FIG. 4B. There, the elicitation environment is initialized at Step 407, the sample 115A is placed on the non-replicative behavior elicitor 204 at Step 408, the content of the registry 114A is saved at Step 409, the sample 115A is executed at Step 410, at Step 411 the content of the registry 114A is again saved after the sample 115A is executed, and the non-replicative behavior elicitor 204 environment is terminated at Step 412. The controller 201 may run the non-replicative behavior elicitor 204 a plurality of times until predefined terminating conditions are met. After each run of the non-replicative behavior elicitor 204 the controller 201 performs a partial analysis at Step 402 (FIG. 4A) of the changes made to the system during the non-replicative behavior elicitation to determine if the terminating conditions have been met (Step 403). If the terminating conditions have not been met, the process is repeated. In some cases explained below, it is desirable to repeat the process with another infected sample 115. The is possible only when the virus replication Step 303 was successful and more than one known infected file 213A exists. If this is the case, the results of the virus replication 303 are examined again, and a next best infected program 115A is selected as a current sample from the infected known files, based on the entries in module 208 being prioritized as a function of their suitability for use by the side effects analyzer 202.

The actual number of times that the non-replicative behavior elicitor 204 is run may depend on both an externally imposed maximum number and on the pattern of behavior of the sample 115.

A maximum allowed number of runs of the non-replicative behavior elicitor 204 can be determined based on: (a) the amount of time needed to run a single sample 115 in the environment being used; and (b) some maximum amount of time that is allowed for the behavior elicitation of a single sample 115. The latter parameter may be a fixed predetermined number, or it may vary depending on a workload of the system.

The pattern of behavior may be determined based on one or more of the following non-limiting examples: the files created after each run of the non-replicative behavior elicitor 204; the changes to the registry 114A and to system initialization files 114B; the relationship between the created files and the changes made to the registry 114A and system initialization files 114B; the relationship between the created files and changes made to the existing files; and the information obtained from the registry 114A and file monitors. The files that are created may be present in the disk 110 and/or in the memory 105, or in emulated versions thereof.

The conditions under which the system 100 terminates looking for patterns of behavior can be referred to as stopping conditions. As there may be a number of different patterns, different non-limiting examples are now provided for the determination of the stopping conditions for the most common patterns of infection. Different methods may be chosen by those skilled in the art.

A. Registry 114A/System Initialization File 114B Changes and Newly Created Files Occur 1st run: The sample 115 creates file A and modifies registry 114A/initialization files 114B to point to file A.

2nd run: The same results are obtained, and one more run is performed to confirm that the results are not based on a coincidence.

In one case a different file B is created, but consistent registry 114A changes are made.

In this case another confirmatory run is made.

In a second case inconsistent results are obtained, and another sample 115 is selected (if available) and the run is repeated.

3rd run: Consistent results are obtained, and the stopping condition is satisfied. If inconsistent results are obtained, the process is repeated with another sample 115.

If the results are still inconsistent and another sample 115 is available, some number (e.g., three) more runs are performed with another sample 115, and a decision is made based on the combined information from all of the runs over the plurality of samples 115.

B. Only Registry 114A/System Initialization File 114B Changes Occur

Some number, e.g., four, runs are made with different samples 115, for example two runs with one sample 115 and two runs with another sample 115, if possible.

If the changes between sample runs are inconsistent, another sample 115 is obtained and two additional runs are performed.

C. Created Files Match Previous Changed/Hidden/Deleted Files

If more than some number, e.g., greater than two, files changed in this way, additional runs, for example two runs, are made with different samples 115, if possible.

If at least one file changed in this manner, then two runs are made with one sample 115 and two runs are made with another sample 115 if the results are consistent. If the results are inconsistent, a new sample 115 is obtained and two more runs are made.

D. Only Created Files Occur

If a sample 115 only creates files without changing anything else on the system 100, e.g., no registry 114A changes are made, in theory a considerable number of runs are needed to distinguish a sample 115 of malicious software that uses one of several predefined file names from one that generates a file name at random. Since in most implementations a significant number of runs is necessary to accurately distinguish the case of more than two or three different names from that of randomly generated names, it is preferred to establish a metric such that the number of runs to be made is equal to a minimum of n times the number-of-observed-filenames and the maximum allowed number of runs. The value of n may be four. If the maximum allowed number of runs is less than four times the number-of-observed-names, the controller 201 assumes that the sample 115 creates the file name at random.

After the elicitation phase is completed, the results are passed to the side effects analyzer 202, unless the elicitation was run for a generically repaired original sample 115B, in which case the processing continues with Step 309.

The operation of the side effects analyzer 202 is illustrated in FIG. 5A. The results of behavior elicitation 204 are received by the analyzer at Step 501, and the changes to the system are determined by comparing the before/after images of the elicitation environment. The list of registry 114A changes are obtained by comparing a before and after registry 114A dump or, if the "after" registry 114A dump is not available, for example if running the sample 115 program caused the system 100 to crash, by using the registry 114A access information from behavior monitors via identifying the registry 114A changing APIs. For example, in Windows™ systems these APIs include, but are not limited to, CreateKey, SetValue and DeleteKey. The information obtained from the behavior monitors 216 is compared to the dump of the "old" or "before" registry 114A in order to ensure that the change has indeed occurred. For example, the invocation of the CreateKey API may not result in a change if the key is already present in the registry 114A, or if it is followed by the DeleteKey instruction.

During the side effects analysis process the changes that may occur during the normal operations of the computing system 100 are identified and ignored. Examples of this type of changes are created temporary files and changes to the registry 114A keys indicating the time of an event or the location of a window. In the presently preferred embodiment, all changes to the numerical values of registry 114A keys are ignored during the side effects analysis process.

The side effects analyzer 202 then checks to determine if the information about the behavior of a corresponding uninfected file is available in Step 503, i.e., if a known program infected during the virus replication Step 303 was used as the sample 115 during the elicitation phase of FIG. 4, or if the operation of the generic repair 205 was successful. If the uninfected file information is not available, the file is sent to the program identifier 206.

Steps 507 and 508 of FIG. 5B illustrate the operations of the program identifier 206. The program identifier 206 first attempts to identify the program by the changes its execution made to the system (Step 507), and then by the changes the programs GUI made by calling the GUI analyzer 207 (Step 508).

If the program is identified by the combination of these two methods, the processing continues with the Step 505, where the results of behavior elicitation for infected and uninfected programs are compared. If the uninfected program corresponding to the original sample 115A of the undesirable software entity cannot be located at Step 509, the changes are compared with the combined information regarding changes made by the set of known programs stored in the module 210 (Step 510).

During the final analysis of the results at Step 506 the detected system changes are evaluated and the interdependencies between the non-replicative changes and the relationship between them and the replicative changes are determined. The several special cases including renamed files, deleted files and hidden files are identified by comparing created files with the original copies of the infected files, if they exist, deleted files or hidden files. The changes to the system initialization files 114B and the system registry 114A are identified and analyzed to determine if they point to the newly created files.

An output 202A of the side effects analyzer 202 preferably includes human readable logs identifying the detected side effects. The output 202A of the side effects analyzer 202 preferably also includes computer program-readable instructions known to those skilled in the art as "definitions". These definitions are stored and are later used for the automated removal of non-replicative changes made by another instance of the undesirable software entity present in the sample 115A, which is a desired result. Note that the undesirable software entity may cause both replicative and non-replicative changes to the system, or it may cause only non-replicative changes. The presently preferred embodiment of the invention enables the removal of the non-replicative changes made by the software entity, while the entity itself can be removed using conventional disinfecting software.

Based on the foregoing description it should be appreciated that this invention also encompasses a computer readable media product containing a set of computer executable software instructions for directing the computer system 100 to execute a process for determining a non-replicative behavior of a program (sample 115) suspected of containing an undesirable software entity. The process causes execution of the program in at least one known environment, and performs an automatic examination of the at least one known environment to determine if a change has occurred in the environment as a result of the execution of the program. If a change is detected, the process further causes an automatic analysis of the change to determine what non-replicative behavior of the suspected malicious program resulted in the determined change, and outputs for recordal a result of the analysis for use in automatically identifying and removing side effects of the undesirable software entity.

While the invention has been particularly shown and described with respect to preferred embodiments thereof, it will be understood by those skilled in the art that changes in form and details may be made therein without departing from the scope and spirit of the invention.

What is claimed is:

1. A method, comprising:

executing, by a first computer system, a program suspected of containing an undesirable software entity exhibiting non-replicative behavior in at least one controlled environment, where executing the program comprises infecting a plurality of goat files, selecting an infected goat file deemed to be most effective for soliciting side effects generations based on at least one criterion, and executing the selected infected goat file;

automatically examining, by a second computer system, the at least one controlled environment to detect if a change has occurred in the environment as a result of the execution of the program and, if a change is detected, automatically analyzing the detected change to determine if the change resulted from normal execution of the program or from execution of the undesirable software entity, where normal execution of the program comprises execution of the program when the program does not contain the undesirable software entity, where automatically examining the at least one controlled environment comprises comparing a first system state that results from the execution of the selected infected goat file with a second system state that results from the execution of a non-infected version of the selected goat file; and using, by a third computer system, a result of the analysis for at least one of undoing a detected change that results from execution of the undesirable software entity and informing a user of the changes that have been observed to result from the execution of the undesired software entity, where if the step of infecting a plurality of goat files is unsuccessful the step of executing the program executes the program and a generically repaired version of the program, and the step of automatically examining the at least one controlled environment comprises comparing a third system state that results from the execution of the program with a fourth system state that results from the execution of the generically repaired version of the program.

2. The method as in claim 1, where a number of times that the program is executed is a function of the type of the detected changes and the consistency of the detected changes between executions of the program.

3. The method as in claim 1, where another program infected during the execution of the program is exercised in the same environment for differentiating between malicious and non-malicious program changes.

4. The method as in claim 1, further comprising disinfecting the program; and exercising the disinfected program in the same environment for differentiating between malicious and non-malicious program changes.

5. The method as in claim 1, further comprising locating a non-infected copy of the program using at least one of a pattern of changes made to the environment during execution of a malicious program and a look and feel of the program.

6. The method as in claim 1, where the program is executed in an environment where requests made by the program to interact with the environment have a potential to create a side effect.

7. The method as claim 6, further comprising always granting a request by the program to interact with the environment.

8. The method as claim 6, further comprising always granting a request by the program for access to an environmental resource.

9. The method as claim 6, further comprising always granting a request by the program for access to a resource located external to the environment.

10. The method as in claim 1, where the program is suspected of containing a virus program.

11. The method as in claim 1, where the program is suspected of containing a worm program.

12. The method as in claim 1, where the program is suspected of containing a Trojan Horse program or being a Trojan Horse program.

13. The method as in claim 1, where the step of automatically examining includes comparing a current state of the environment after the program is executed at least once to a state of the environment before the program was executed.

14. The method as in claim 1, where the step of automatically examining includes comparing a current state of the environment after the program is executed at least once to a state of the environment that results from the execution of a known non-infected version of the program, and ignoring side effects that result normally from program execution.

15. The method as in claim 1, where the step of automatically examining comprises comparing a current state of the environment after the program is executed at least once to a state of the environment that results from the execution of a generically repaired version of the program, and ignoring side effects that result normally from program execution.

16. The method as in claim 1, where the step of automatically examining comprises comparing a current state of the environment after the program is executed at least once to a state of the environment that is ascertained from a look and feel analysis of the operation of a graphical user interface of the program to determine the identity of the original uninfected program, and ignoring side effects that result normally from program execution.

17. The method as in claim 1, where the step of automatically examining comprises comparing a current state of the environment after the program is executed at least once to a state of the environment that results from the execution of a plurality of commonly used programs, and ignoring side effects that result normally from program execution.

18. The method as in claim 1, where the step of automatically examining comprises comparing a content of a registry after the program is executed at least once to a saved content of the registry that results from the execution of at least one of a known non-infected version of the program and a generically repaired version of the program, and identifying differences in the registry contents as side effects that are used for at least one of undoing a detected change that results from execution of the undesirable software entity and informing a user of the side effects.

19. The method as in claim 1, where the step of automatically examining comprises comparing system initialization files after the program is executed at least once to saved system initialization files that result from the execution of at least one of a known non-infected version of the program and a generically repaired version of the program, and identifying differences in the system initialization files as side effects that are used for at least one of undoing a detected change that results from execution of the undesirable software entity and informing a user of the side effects.

20. A computer readable storage memory storing a set of computer executable software instructions for execution by a computer, said execution resulting in operations comprising:
   executing a program suspected of containing an undesirable software entity exhibiting non-replicative behavior in at least one controlled environment, where executing the program comprises infecting a plurality of goat files, selecting an infected goat file deemed to be most effective for soliciting side effects generations based on at least one criterion, and executing the selected infected goat file;
   automatically examining the at least one controlled environment to detect if a change has occurred in the environment as a result of the execution of the program and, if a change is detected, automatically analyzing the detected change to determine if the change resulted from normal execution of the program or from execution of the undesirable software entity, where normal execution of the program comprises execution of the program when the program does not contain the undesirable software entity, where automatically examining the at least one controlled environment comprises comparing a first system state that results from the execution of the selected infected goat file with a second system state that results from the execution of a non-infected version of the selected goat file; and
   using a result of the analysis for at least one of undoing a detected change that results from execution of the undesirable software entity and informing a user of the changes that have been observed to result from the execution of the undesired software entity, where if the step of infecting a plurality of goat files is unsuccessful the step of executing the program executes the program and a generically repaired version of the program, and the step of automatically examining the at least one controlled environment comprises comparing a third system state that results from the execution of the program with a fourth system state that results from the execution of the generically repaired version of the program.

21. The computer readable storage memory as in claim 20, where examining comprises comparing a current state of the environment after the program is executed at least once to a state of the environment before the program was executed.

22. The computer readable storage memory as in claim 20, where examining comprises comparing a current state of the environment after the program is executed at least once to a state of the environment that results from the execution of a known non-infected version of the program.

23. The computer readable storage memory as in claim 20, where examining comprises comparing a current state of the environment after the program is executed at least once to a state of the environment that results from the execution of a generically repaired version of the program.

24. The computer readable storage memory as in claim 20, where examining comprises comparing a current state of the environment after the program is executed at least once to a state of the environment resulting from execution of a program selected on the basis of its look and feel, as determined from operation of a graphical user interface of the program.

25. The computer readable storage memory as in claim 20, where examining comprises comparing a current state of the environment after the program is executed at least once to a state of the environment that results from the execution of a plurality of commonly used programs.

26. The computer readable storage memory as in claim 20, where examining comprises comparing a content of a registry after the program is executed at least once to a saved content of said registry that results from execution of at least one of a known non-infected version of the program and a generically repaired version of the program; and identifying differences in registry contents as side effects that are used for at least one of undoing a detected change that results from execution of the undesirable software entity and informing a user of the side effects.

27. The computer readable storage memory as in claim 20, where examining comprises comparing system initialization files after the program is executed at least once to saved system initialization files that result from execution of at least one of a known non-infected version of the program and a generically repaired version of the program; and identifying differences in the system initialization files as side effects that are used for at least one of undoing a detected change that results from execution of the undesirable software entity and informing a user of the side effects.

28. A computer system comprising:
   a behavior elicitation subsystem comprising a memory and a processor, where the behavior elicitation subsystem is configured to execute a program suspected of containing an undesirable software entity exhibiting non-replicative behavior in at least one controlled environment, where executing the program comprises infecting a plurality of goat files, selecting an infected goat file deemed to be most effective for soliciting side effects generations based on at least one criterion, and executing the selected infected goat file; and
   a controlling subsystem comprising a memory and a processor, where the controlling subsystem is configured to automatically examine the at least one controlled environment to detect if a change has occurred in the environment as a result of the execution of the program and, if a change is detected, to automatically analyze the detected change to determine if the change resulted from normal execution of the program or from execution of the undesirable software entity, where normal execution of the program comprises execution of the program when the program does not contain the undesirable software entity, where automatically examining the at least one controlled environment comprises comparing a first system state that results from the execution of the selected infected goat file with a second system state that results from the execution of a non-infected version of the selected goat file,
   where the controlling subsystem is further configured to use a result of the analysis for at least one of undoing a detected change that results from execution of the undesirable software entity and informing a user of the changes that have been observed to result from the execution of the undesired software entity, where if the step of infecting a plurality of goat files is unsuccessful the step of executing the program executes the program and a generically repaired version of the program, and the step of automatically examining the at least one controlled environment comprises comparing a third system state that results from the execution of the program with a fourth system state that results from the execution of the generically repaired version of the program.

* * * * *